(12) United States Patent
Noonan

(10) Patent No.: US 7,111,418 B2
(45) Date of Patent: Sep. 26, 2006

(54) WHEELED SHOVEL

(75) Inventor: Mark Noonan, New Canaan, CT (US)

(73) Assignee: Snow Solutions LLC, New Canaan, CT (US)

( * ) Notice: Subject to any disclaimer, the term of this patent is extended or adjusted under 35 U.S.C. 154(b) by 10 days.

(21) Appl. No.: 10/808,841

(22) Filed: Mar. 25, 2004

(65) Prior Publication Data

US 2005/0160633 A1 Jul. 28, 2005

Related U.S. Application Data

(60) Provisional application No. 60/539,066, filed on Jan. 26, 2004.

(51) Int. Cl.
*E01H 5/02* (2006.01)
(52) U.S. Cl. .................. 37/265; 37/285; 294/54.5
(58) Field of Classification Search ............ 37/265, 37/284, 285, 264, 278, 273; 172/354, 358, 172/365; 294/54.4, 57
See application file for complete search history.

(56) References Cited

U.S. PATENT DOCUMENTS

| 328,633 A | * | 10/1885 | Angell ............... 37/265 |
| 998,517 A | * | 7/1911 | Humm .............. 15/79.2 |
| 1,514,076 A | | 11/1924 | Brown |
| 1,683,732 A | | 9/1928 | Selin |
| 2,470,217 A | * | 5/1949 | McLoughlin ......... 37/434 |
| 2,520,606 A | * | 8/1950 | McLoughlin ......... 414/444 |
| 2,715,786 A | | 8/1955 | Dorko |
| 2,863,232 A | | 12/1958 | Steinbach et al. |
| 2,867,827 A | | 1/1959 | Gantz |
| 2,930,152 A | | 3/1960 | Pipkin |
| 3,107,446 A | * | 10/1963 | Messinger ............ 37/434 |
| 3,136,574 A | * | 6/1964 | Pasquale ............. 294/54.5 |
| 3,468,041 A | | 9/1969 | Mattson et al. |
| 3,469,326 A | | 9/1969 | Malickson |
| 3,475,838 A | * | 11/1969 | Hagen et al. ........ 37/265 |
| 3,643,356 A | | 2/1972 | Gohl |
| 3,748,761 A | | 7/1973 | Chetwynde |

(Continued)

FOREIGN PATENT DOCUMENTS

CA 2501109 3/2005

(Continued)

OTHER PUBLICATIONS

Field Corn Planter, http://etc.usf.edu/clipart/4200/4213/planter_5.htm, Mar. 11, 2005, 2 pages.

*Primary Examiner*—Thomas A Beach
(74) *Attorney, Agent, or Firm*—Harness, Dickey & Pierce, P.L.C.

(57) ABSTRACT

An apparatus comprising a shovel disposed on a relatively large wheel and a method of using the apparatus for handling a load of material. The apparatus involves a shovel having a handle formed at the end of an elongate yoke, the yoke being mounted, at its middle portion, onto the axle of a relatively large wheel for the purpose of picking up of a load, transporting it to a location, and propelling the load overboard with a quick arm/body motion on the part of a person operating the handle. The substantially waist-high wheel is adapted to receive the body force of an operator as an effective leverage through the handle and cause a recoil action from the wheel to enhance the throwing power of the apparatus of the invention, comprising the shovel, the wheel and the yoke as the driving member.

59 Claims, 5 Drawing Sheets

U.S. PATENT DOCUMENTS

| | | | |
|---|---|---|---|
| 3,751,058 A | 8/1973 | Larsen | |
| 4,153,287 A | 5/1979 | Townsend | |
| 4,161,073 A | 7/1979 | Oakes | |
| 4,179,828 A | 12/1979 | Brunty | |
| 4,214,385 A | 7/1980 | Baranowski et al. | |
| 4,224,751 A | 9/1980 | Schoemann et al. | |
| 4,231,604 A * | 11/1980 | Obergfell | 294/59 |
| 4,690,447 A * | 9/1987 | Adams | 294/57 |
| 4,704,758 A * | 11/1987 | Hoffman | 15/144.4 |
| 4,865,373 A * | 9/1989 | Hudson | 294/54.5 |
| D314,318 S | 2/1991 | Uimonen | |
| 5,048,206 A | 9/1991 | Jones | |
| 5,054,278 A * | 10/1991 | Thorndike | 56/400.14 |
| 5,074,064 A | 12/1991 | Nickels | |
| 5,117,530 A | 6/1992 | Rank | |
| 5,123,187 A | 6/1992 | Zamaria | |
| 5,511,327 A | 4/1996 | Jurkowski et al. | |
| D375,235 S | 11/1996 | Spear et al. | |
| 5,581,915 A | 12/1996 | Lobato | |
| 5,727,799 A | 3/1998 | DiSario | |
| 5,810,408 A * | 9/1998 | Armstrong | 294/57 |
| 5,918,921 A | 7/1999 | Samuelson | |
| D415,663 S | 10/1999 | Whitehead et al. | |
| 5,970,692 A * | 10/1999 | Foster | 56/12.1 |
| 6,053,548 A | 4/2000 | Bowles, Jr. | |
| 6,163,986 A * | 12/2000 | Townsend | 37/265 |
| 6,334,640 B1 * | 1/2002 | Werner et al. | 294/54.5 |
| D459,641 S | 7/2002 | Guneysu | |
| 6,474,007 B1 * | 11/2002 | Sueshige et al. | 37/266 |
| 6,643,958 B1 | 11/2003 | Krejci | |
| 6,675,507 B1 | 1/2004 | Petruzzelli | |
| 6,735,887 B1 * | 5/2004 | Muzzammel | 37/285 |
| 6,922,920 B1 * | 8/2005 | Stratz | 37/197 |

FOREIGN PATENT DOCUMENTS

| | | |
|---|---|---|
| CN | 200510059163.8 | 3/2005 |
| EP | 1 580 322 | 3/2005 |
| FR | 865.426 | 5/1941 |
| JP | 2005-087306 | 3/2005 |
| WO | WO 2005/098142 | 10/2005 |

* cited by examiner

WHEELED SHOVEL

This application claims the benefit of priority from U.S. Provisional Patent Application Ser. No. 60/539,066 filed on 26 Jan. 2004.

FIELD OF INVENTION

The invention relates generally to manual wheeled vehicles for moving and disposing materials. More particularly, the present invention relates to a snow removal shovel on a wheel which provides a recoil action to assist in propelling the snow.

BACKGROUND OF INVENTION

Numerous manual wheeled vehicles have been in use to assist in transporting materials from one place to another. The age old wheelbarrow is, of course, well known. However, aside from transporting alone, loading onto and unloading of materials from a vehicle easily and with minimum stress and strain to the human body have required different approaches. This has been true for shoveling or plowing snow, including wet and heavy slushy snow.

In U.S. Pat. No. 5,918,921, Samuelson shows a levered shovel for moving snow. The shovel includes a blade for carrying the snow, a shaft that extends from the blade, a wheel assembly for contacting a horizontal surface and which depends from the shaft, and a handle assembly for gripping by the user and which is disposed on the rearmost end of the shaft. The wheel assembly comprises either an axle fork, an axle rotatively mounted to the axle fork, and a pair of wheels attached to the axle or an inverted T-shaped member with its transverse portion serving as its axle to which a pair of wheels are rotatively attached. The handle assembly comprises a lower transverse member for gripping by the hands of the user and extends laterally from both sides of the rearmost end of the shaft and an extender for elevating the point at which the user grips the handle assembly for users with limited bending posture.

Jurkowski, et al., disclose a wheeled snow shoveling device in U.S. Pat. No. 5,511,327. The shoveling device comprises a cart having a handle formed in a generally A-shaped configuration with a cross bar including a circular ring extending therefrom. The cart includes a wheel with an axle positioned at its axis, the wheel including a pair of vertical support bars affixed to the axle, the wheel also including a pair of horizontal braces affixed to its axle. The lower segment of the handle is coupled to the braces. A snow shovel has a blade formed as a generally rectangular shaped member and is molded into a semi circular configuration, the rear surface of the blade being coupled to the free ends of the horizontal braces of the cart wheel. The blade has a wooden shaft affixed to its rear surface, the shaft extending through the circular ring on the cross bar of the handle, the free ends of the vertical support bars being coupled to the shaft.

In another approach for removal of snow, Petruzzelli discloses in U.S. Pat. No. 6,675,507 an articulated shovel blade for pivoting movement relative to a wheeled carriage on which the blade is mounted. The shovel blade is adjustably locked in position at different angles relative to the direction of travel of the carriage, for pushing snow or other material to the side of the shovel as it travels across the ground. The carriage is pushed forward using a handle or a motor is provided for self-propelling the carriage.

In still another approach, Lobato describes in U.S. Pat. No. 5,581,915 a snowplow carriage assembly for removal of snow manually by plowing the snow in an area to be cleared of snow. The carriage is a manually propelled wheeled structure made of a plurality of members pivotally connected for collapsing and folding for storage and unfolding for use in supporting and transporting a snowplow in the form of a replaceable conventional snow shovel having a handle straight length portion. The carriage is configured so that the snow shovel handle is removably mounted thereon inclined from the horizontal defining an acute angle relative to a surface on which snow is being plowed. The snow shovel inclination is variable for establishing different acute angles of the shovel relative to the surface for plowing the snow thereon and removal therefrom.

In U.S. Pat. No. 6,643,958, Krejci discloses a snow throwing shovel device for removing snow from narrow sidewalks and from steps where a conventional snow blower cannot be used. The snow throwing shovel device includes a scoop assembly including a housing having top, bottom, side, and back walls, and also having an open front. The shovel also includes an elongate chute attached to the scoop through which snow is moved. The shovel further includes a discharge spout rotatably mounted to the elongate chute, handle members attached to the elongate chute; and an assembly for picking up snow and moving snow through the elongate chute.

The present state of the art, thus, generally provides two types of shovels which are particularly common. One type involves lifting and throwing of the snow, and the other involves pushing of the snow like plowing. These cited patents are incorporated by reference in their entirety. As recognized by the inventor hereof, what is needed are snow shovels where the plowing type of action can be incorporated into a shovel which also lifts and throws the snow with ease and with less ergonomical discomfort.

SUMMARY OF INVENTION

The present invention involves a wheeled shovel having a handle formed at the end of an elongate yoke, the yoke being mounted, near its middle portion, onto the axle of a relatively large wheel for the purposes of picking up of a load, transporting it to a destination, and propelling the load overboard with a quick body (or arm) motion on the part of a person operating the handle. The substantially waist-high wheel is adapted to receive the body force of an operator as an effective leverage through the handle and cause a recoil action from the wheel to enhance the throwing power of the apparatus of the invention, comprising the shovel, the wheel and the yoke as the driving member.

An embodiment of the present invention involves an apparatus for removing and disposing materials. The apparatus comprises a wheel assembly having a rim and axle connected together with spokes radially projecting from the axle. The axle includes a fulcrum member capable of transmitting a recoil reaction to an action applied at the axle. A driving member has an upper portion, a middle portion and a lower portion. The middle portion is generally "S-shaped" and is attached to the fulcrum member of the axle. A handle is attached to the upper portion of the driving member and is capable of moving the wheel assembly. A blade is attached to the lower portion of the driving member. The blade is adapted to pick up a load of material from a surface when the blade is lowered to the surface by raising the handle and pushing forward. When the handle is pushed downwards, the downward action causes the wheel assembly to compress and recoil through the fulcrum member at the axle of the wheel assembly. As a result, the blade springs upwards and forwards, thereby propelling the load of material briskly away from the apparatus.

An aspect of the embodiment of the present invention comprises a wheel assembly having a rim and an axle, the axle further comprising a tubular body having two ends adapted to receive spokes which connect the axle to the rim. The axle further is adapted to receive a plurality of springs at the two respective ends of the axle to act as a fulcrum, and transmit a recoil reaction to an action applied at the axle. An elongate U-shaped driving member has a curved upper portion, a generally straight middle portion, and an open lower portion. The middle portion is attached to the springs at each end of the axle. A handle forms the upper portion of the driving member, and is capable of moving the wheel assembly. A shovel blade attaches to the lower portion of the driving member. The shovel blade is adapted to pick up material from a surface when the blade is lowered to the surface by raising the handle and pushing forward. The blade springs upwards and forwards, thereby releasing the material briskly away from the apparatus when the handle is pushed downwards to cause the springs to compress and recoil through the fulcrum member at the axle of the wheel.

Another embodiment of the present invention involves a method of snow removal using an apparatus comprising relatively large wheel substantially at the waist level of an operator. A U-shaped yoke has a handle at a closed end, a shovel blade at an open end, and the yoke is mounted onto an axle of the wheel. The method involves an operator moving the apparatus along a path by pushing the handle and rolling the wheel in a direction commanded by the handle. The operator shoves onto the blade a load of material along the path of the apparatus. After picking up the load of material, the operator presses the handle downwards, to lift the shovel blade to a level that clears the path; adjusts further the level of the shovel blade to achieve a balanced load with respect to and over the axle of the wheel; transports the balanced load of material to a destination; and at the destination, briskly applies body weight at the handle to propel the load of material to a substantial distance away from apparatus.

DETAILED DESCRIPTION

Figure 1:
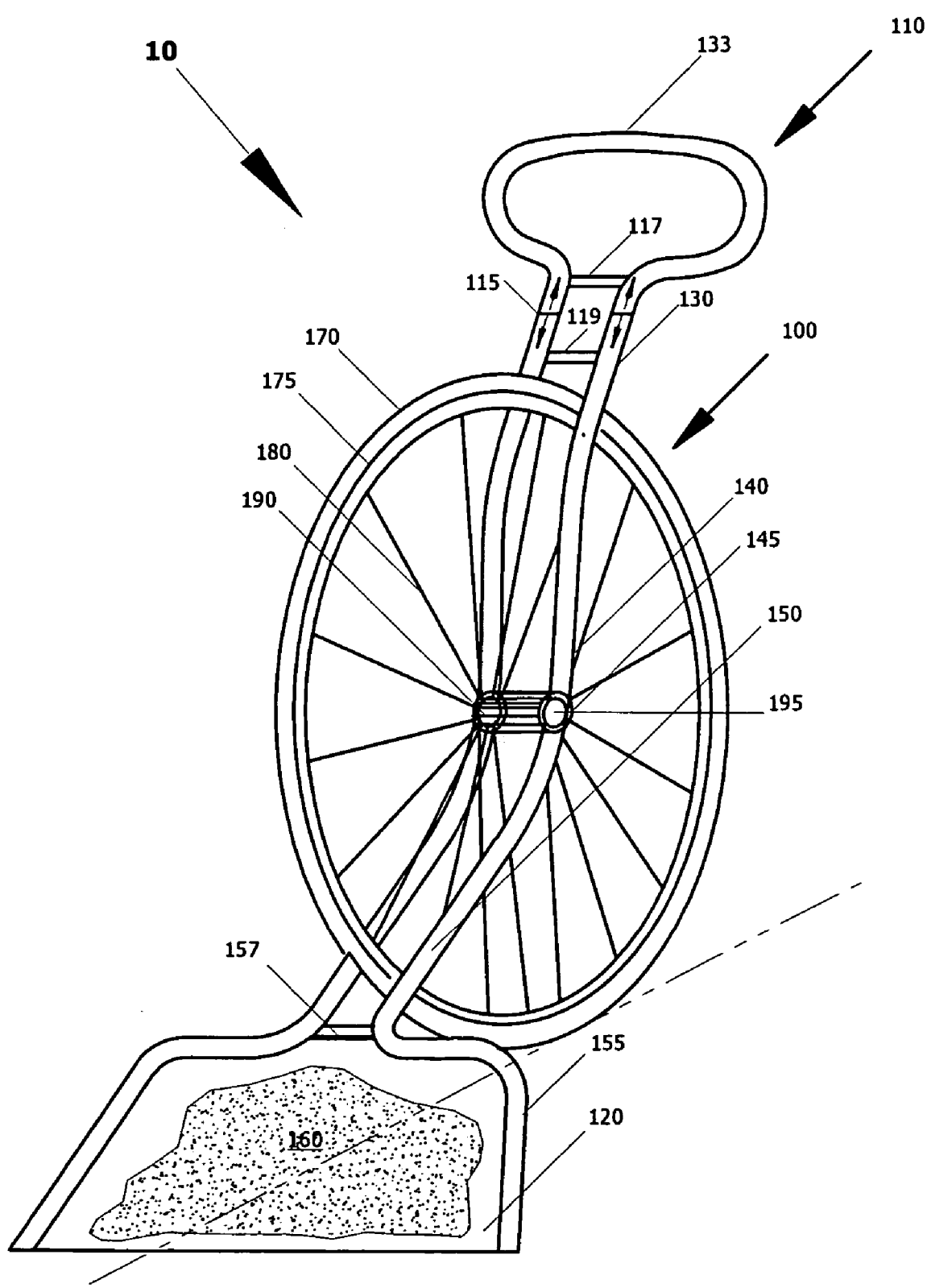
FIG. 1 is a three-dimensional embodiment of an apparatus according to one exemplary embodiment of the present invention showing a relatively large wheel incorporated into a driving member in the shape of a yoke, the yoke having a handle at one end and a shovel blade at the other, for picking up, transporting and disposing materials in general, and snow in particular.

Referring now to the drawings, FIGS. 1–8, there are shown embodiments of the present invention involving the pick up, transport and disposal of materials in an efficient and effective manner.

Reference numeral 10 in FIG. 1 generally refers to an apparatus representing an embodiment of the present invention comprising a wheel assemble 100, a driving member 110, resembling substantially a U-shaped yoke having a handle 133 at its closed end and a shovel blade 120 attached to its open end, wherein the yoke is mounted onto the axle 190 of the wheel. The wheel and the blade are incorporated into the driving member in a manner that the blade rests on the ground in its normal position. An operator uses the handle to move the shovel in any direction by rolling the wheel on the ground. The operator also uses the handle to guide the shovel in shoving into the blade material lying along the blade's path. The operator then lifts the shovel blade off the ground to pick up a load of material, followed by further lifting to balance the load at a comfortable walking posture. At the desired destination, the operator presses on the handle with a quick downward body (or arm) motion, to propel the load away from the shovel. The operator can dispose the material either straight ahead by directing the shovel in the direction of the motion of the apparatus, or to the side by flipping the shovel sideways.

It will be appreciated by those skilled in the art and by ordinary users of snow shovels that the large wheel 100 shown in FIG. 1 (as further defined below and depicted in FIG. 3 relative to human dimensions) enables a user to lift the blade and snow thereon above the unshoveled snow height and travel over the unshoveled snow or other rough surface without compressing the unshoveled snow within the unshoveled area to be traversed. The relatively high level handle of the shovel enables the user to comfortably accelerate forward the load of snow off the blade while pushing down the handle, which enhances the throw distance of the snow trajectory.

The wheel assembly 100, driving member 110 and shovel 120 are formed ergonomically to assist in picking up and releasing a heap of material 160, such as sand, gravel or snow, generally aligned in the direction of motion, with less stress to the body of the operator, and especially to help prevent back stress or injury. As will be explained more in detail later in an embodiment of the present invention, a recoil assist is provided to the action of the operator of the apparatus from a fulcrum area of the apparatus to release the material in a brisk and efficient manner. The material can also be picked up and released while the wheel is stationary. Furthermore, the material can be throwingly released, or propelled, forward or sideways, as desired, while the wheel is stationary or in motion.

In an embodiment of the present invention shown in FIG. 1, driving member 110 is formed preferably of continuous metal tubing that is shaped to have a handle 133 in its upper portion 130, a fulcrum bearing area 145 in middle portion 140 and an open frame 155 in the lower portion 150 to accept blade 120. Handle 133 is extendable at 115 to permit length, height and leverage adjustments, as will be described in more detail later in the various embodiments of the present invention. Fulcrum bearing area 145 shown in the same FIG. 1 comprises an opening in the middle portion 140 of the driving member, preferably capable of receiving a roller bearing (not shown). A portion 195 of axle 190 of the wheel assembly 100 fits inside the fulcrum area 145 of the driving member. The attachment point at 145 is designed to reconfigure the shovel for user height, strength and snow conditions. An attachment that can slide along the middle portion of the driving member can be used to adjust the height of the handle for leverage as well as for ease of operation of the apparatus. Aspects of the function of the fulcrum, and attachments thereto, will be explained in more detail below with respect to the relationship of the fulcrum to the handle and the shovel for disposing of materials from the shovel in a brisk, and yet ergonomically advantageous manner.

In an aspect of the embodiment shown in FIG. 1, the driving member 110 is formed in an elongate U-shaped, resembling a yoke, with an upper portion providing the handle 133, and a narrowed middle portion 140 with distal sides to accommodate the axle 190 of the wheel assembly 100. The distance between the relatively long legs (encompassing generally the middle portion 140) of the U-shaped driving member 110 is determined by braces 117, 119 and 157 formed judiciously between the legs so that the axle fits in the fulcrum areas 145. It will be known to those skilled in the art that any number of different ways can be employed to attach the axle of the wheel in the openings forming the fulcrum areas 145. For example, the well-known quick release for bicycle wheels can be employed. Or, the axle, in the form of a tube having protrusions with inside shoulders (not shown) can be snapped into openings 145 by gently spreading apart the legs 140 of the U-shaped driving member. These wheel mounting features are well known in the art and as they are not significant to the invention, they are not described in detail here in order not to unnecessarily obscure the present invention. It is preferred that the tubing material for the driving member 110 comprises hollow aluminum, or other metal tubing. Non-metal materials, such as plastics may also be used.

Figure 2:
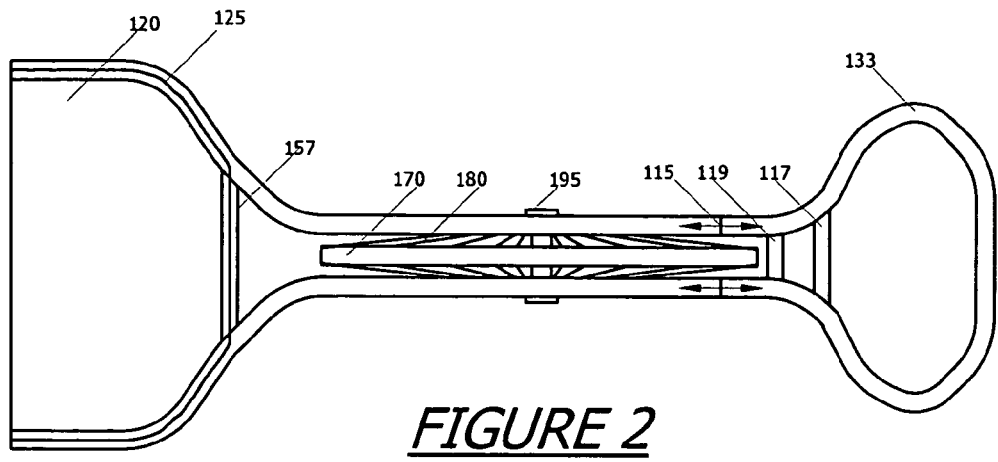
FIG. 2 is a top view of the apparatus of FIG. 1, showing the placement of the shovel and wheel within the yoke, according to the present invention.
Figure 3:
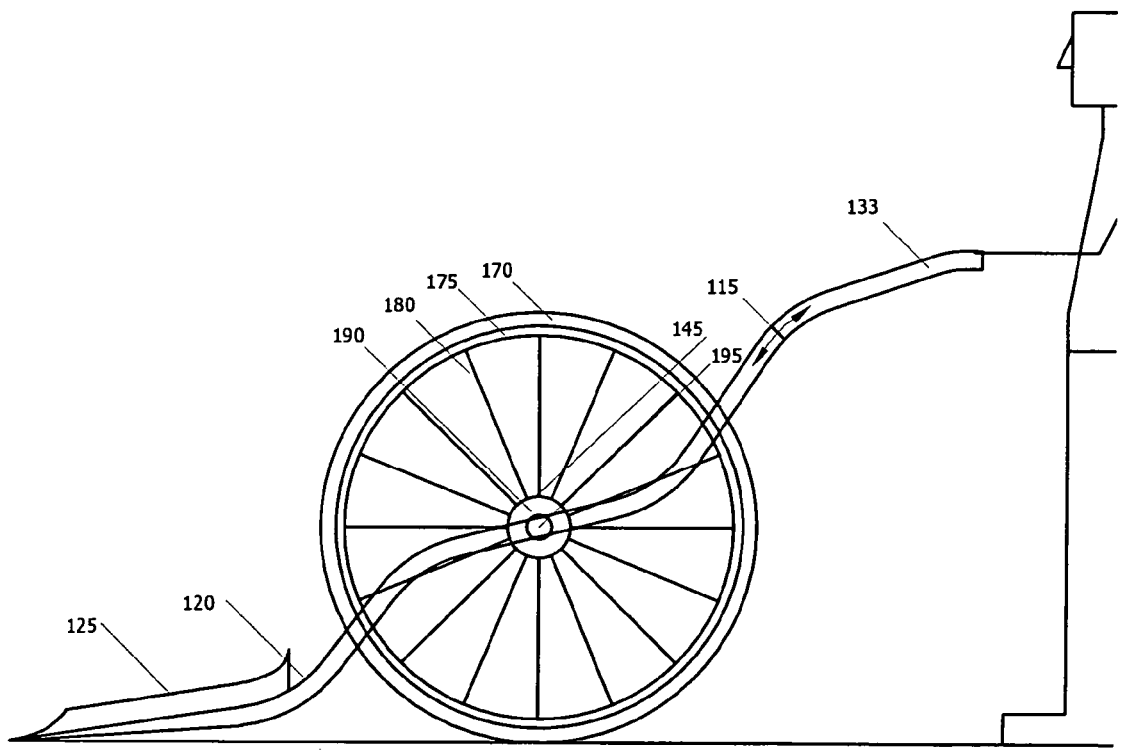
FIG. 3 is a side view of the apparatus of FIG. 2, showing an aspect of the adjustability of the handle of the apparatus, according to the present invention.

In another aspect of an embodiment of the present invention, wheel assembly 100 comprises a wheel 170, a rim 175 and spokes 180 which connect the axle 190 to rim 175, as shown in FIG. 1 and in top view of FIG. 2. Different types of wheels, including different treads, widths or a continuous web connecting the axle to the rim can also be used. Relatively narrow wheels, such as shown in FIG. 1, provide the advantage of not packing down snow, for example, when shoveling snow. The dimensions of wheel 170 and the position of handle 133 relative to axle 190 of the wheel are determined generally with respect to the position of the arms of a human body. A relative position of handle 133 with respect to a general body posture is shown in FIG. 3.

Figure 4:
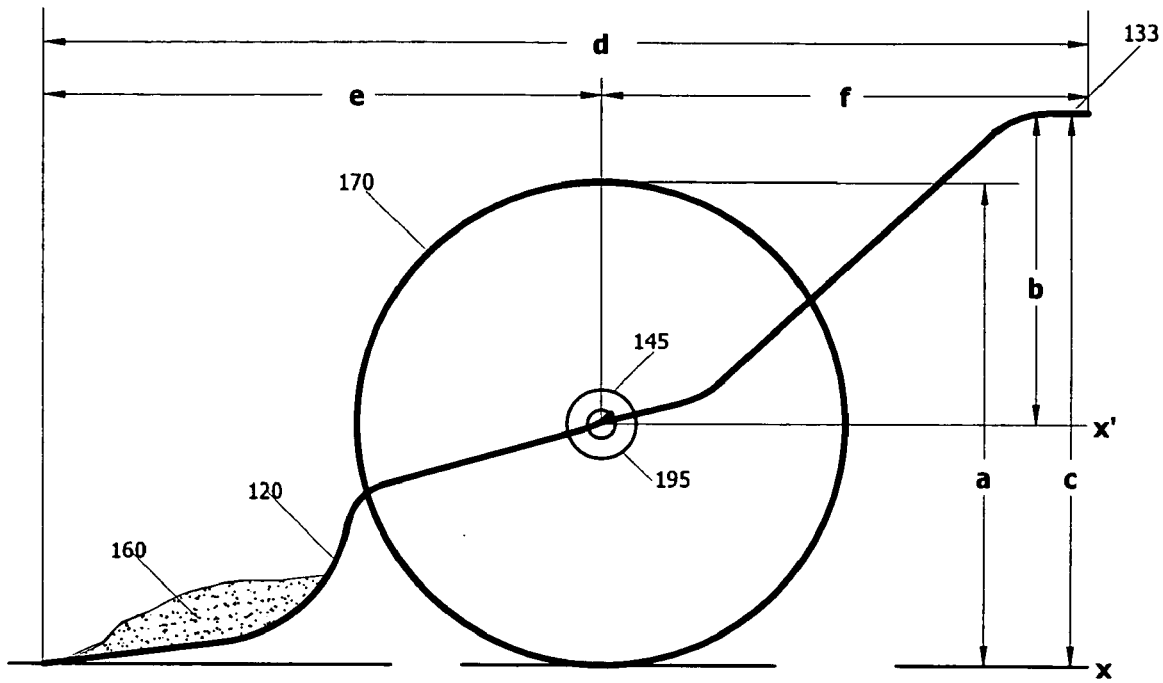
FIG. 4 is a schematic drawing of the apparatus of FIG. 3 showing the various dimensional relationships of the components of the apparatus of the present invention.

In still another aspect of an embodiment of the present invention shown in FIG. 4, it is preferred that the wheel diameter a is between about 30 to 36 inches, while the height of handle 133 from a datum plane directly under the wheel, that is, from a ground datum x, is between about 48 to 60 inches. The height of handle 133 from the center of axle 195 is preferable between about 26 to 42 inches. In another aspect of the present invention, further adjustment of the height of the handle is provided by a telescoping means 115, such as a sliding hollow outer tube over an inner tube as shown in FIG. 3, which ensures better ergonomic comfort.

The overall length d of the wheeled shovel is between about 78 to 88 inches. Distance e from the tip of the shovel blade 120 to the fulcrum area 145 near the center of the wheel assembly 100 is between about 32 to 42 inches. Distance f from the fulcrum area to the tip of the handle shown in FIG. 4 can be varied depending upon the preferences on the part of the operator. For example, distance f can be adjusted to make it easier to pick up and lift a load, balance the load on the apparatus more evenly for ease of transport to a location, and/or to gain more leverage in shoving the load from the shovel at the location of interest.

Figure 5:
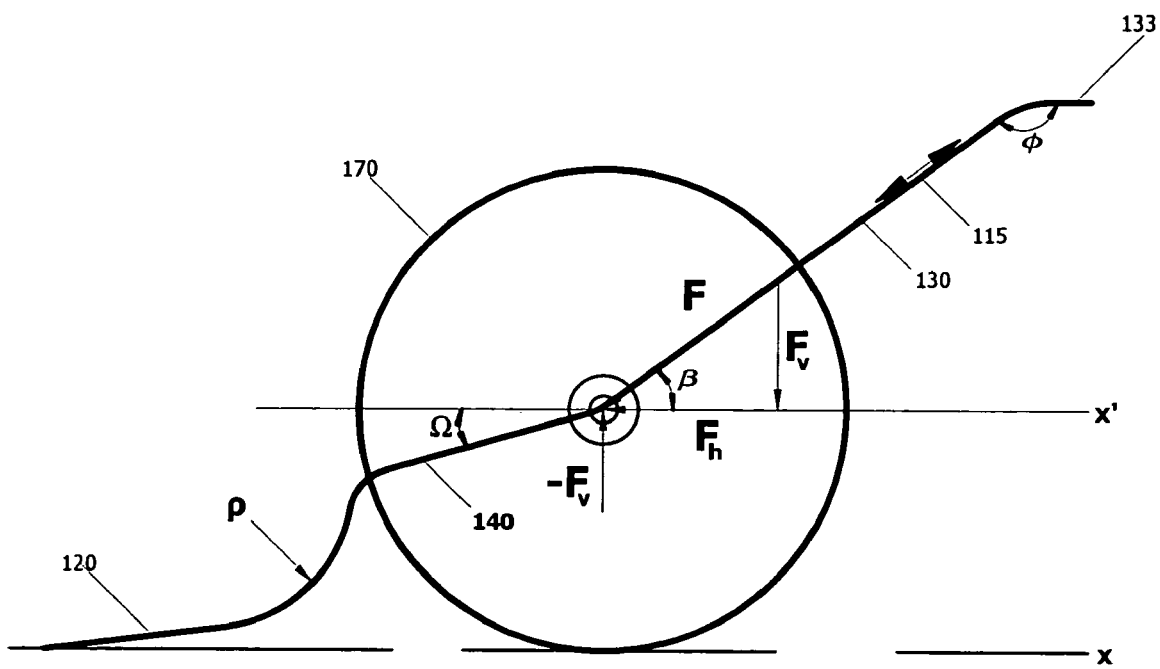
FIG. 5 is another schematic drawing of the apparatus of FIG. 3 showing the various forces acting at the fulcrum of the apparatus, according to the present invention.

Thus, it will be apparent to those skilled in the art that the relationship between the relatively large diameter of the wheel, overall length of the shovel and the height of the shovel handle from the ground determine the ease with which snow may be shoveled. The positioning of the handle generally between the operator's chest and waist (as shown in FIG. 3) (which may vary depending on the height of the operator and conditions, such as death of snow, etc.) assists in pushing the accumulated snow or other material that is being shoveled. A ratio greater than 1:1 between the length of the yoke and the height of the handle provides the ease with which a blade full of snow can be lifted as the handle is lowered. This leverage ratio can be varied by varying the point at which the yoke connects to the axle. Furthermore, differently shaped yokes, such as shown in FIGS. 4 and 5, contribute differently to the efficiency of the shovel. A preferred "S-shaped" yoke is shown in FIG. 6, and will be described in more detail later in the preferred embodiments of the present invention.

In addition to the ergonomic advantages, the embodiments of the present invention provide enhanced functional performance through a judicious use of a fulcrum line formed at the central portion of the wheel assembly show in FIG. 5. Line x' passing through the center of the fulcrum area 145 parallel to the ground datum line x forms the fulcrum line. A force F applied to the fulcrum through an action at the handle 133 can be resolved into a horizontal component $F_n$ and a downward vertical component $F_v$, as shown in FIG. 5. With no substantial resistance to the horizontal component $F_n$, the wheel rolls to the left, in accordance with the direction of the applied force F shown in FIG. 5, while the ground under the wheel reacts to the downward component $F_v$, giving rise to an upward recoil reaction—$F_v$ by the wheel. A brisk and mostly downward action on the handle, using arm and/or body weight, for example, produces a recoil assist to the throwing power. The magnitudes of the component vectors are determined by angle $\beta$, of the transmittal force F substantially by an angle $\Theta$. Angle $\Omega$ contributes to the throwing power. Furthermore, the shovel blade 120 can be formed in different configurations to assist in efficient release of material 160 from the shovel. For example, the shovel blade can have a bottom portion with a relatively large radius of curvature $\rho$, resembling a scoop, for easy sliding of material from the shovel, as well as for keeping the material form sliding backwards and spilling off the shovel. It will be appreciated by those skilled in the art that these various parameters can be set to values that are commensurate with the ergonomic and functional requirements of the apparatus of the present invention.

Figure 6:
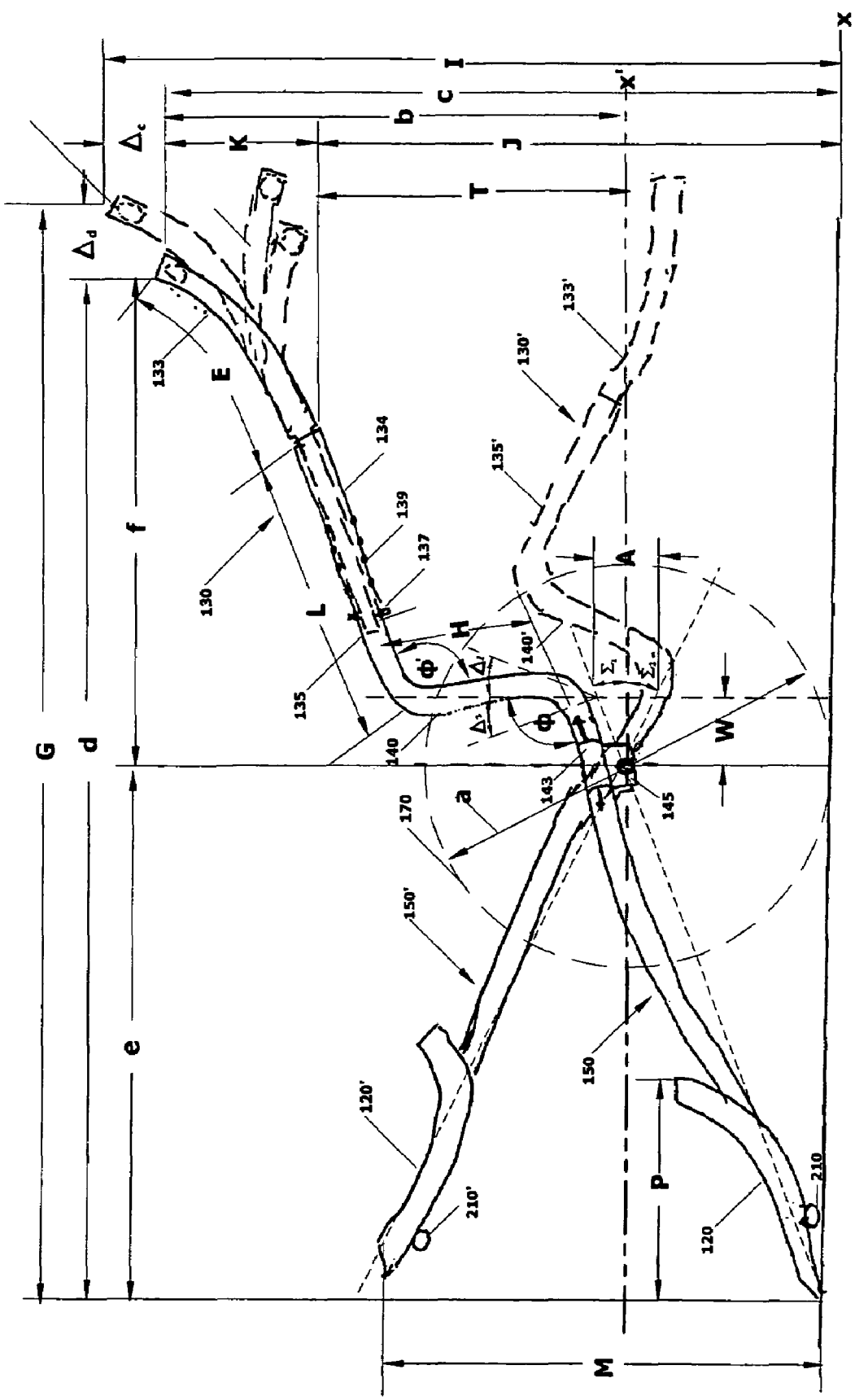
FIG. 6 is a schematic drawing of an embodiment of the present invention showing the yoke having an S-shaped middle portion and a handle which is rotatable and slideably extendable.

FIG. 6 illustrates a preferred embodiment of the invention with similar characters and numerals referring to similar parts throughout the several views. The side-view of the yoke shown in FIG. 6 has an upper portion 130, middle portion 140 and a lower portion 150. The yoke is attached to wheel 170 (shown in phantom) at its axle (not shown) in a notch O of a slideable sleeve 143. Sleeve 143 can be slid (in the direction of either one of the arrows shown in the same figure) over portion 150 of the yoke to change the position of fulcrum 145, the effective leverage length f and the "throw arm" e. The throw is accomplished by pushing handle 133 in a downward direction to the phantom position 133'. The primed reference numerals, namely, 130', 135', 140', 150' and 120', show other parts of the yoke 110, including the shovel blade, in a position following the downward motion of the handle of the yoke 110. It will be understood by those skilled in the art that various different mechanisms can be used to adjust the fulcrum point to achieve the desired leverage for throwing the load off the shovel.

An aspect of an embodiment of the present invention involves an S-curved section forming the middle portion 140 of the yoke shown in FIG. 6. The substantially "S" curve (including the substantially straight section in the middle portion of the curve) is integral to optimizing "gearing"/leveraging in order to enhance the acceleration of the blade and throwing of the load faster, higher and farther from the shovel. The "S" shape is formed to have the lower curve, subtending angle $\phi$, start relatively close to the axle; preferably at a distance W between about 4 to 6 inches from the axle near fulcrum area 145. Angle $\phi$ of the lower portion of the S-curve and angle $\phi'$ of the upper portion, as shown in FIG. 6, are both preferred to be between about 80° and 90°, though it will be appreciated that other angles may also be used. Thus, as handle 133 is lowered, the elbow of the lower portion of the S-curve travels a distance A through arcs $\Sigma_1$ and $\Sigma_2$, as shown in the same FIG. 6. The straight portion of the S-curve traverses the arcs $\Delta_1$ and $\Delta_2$. As the handle is lowered, the S-curve starts moving downward and the handle thus only needs to be lowered an amount equal to T in order to lift blade 120 to height M in new position 120'. It is an aspect of the present invention that, as the middle portion 140 comprising the S-curve, including the straight section, is positioned closer to the fulcrum area 145, the magnitude of A and leverage ratio M/T (the ratio of blade lift to handle movement) are varied accordingly. It is preferred that the length H of the straight section of the S-curve is greater than A so that throughout the entire range of handle motion, the desired leverage (based on axle attachment point) or "gearing", is maintained as the blade is raised and lowered. Thus, for optimal operation (i.e., comfortably, and without bending on the part of the operator of the shovel) it is preferred that the maximum travel T of handle T>H>A, $\Delta_1 \approx \Delta_2$, and $\Sigma_1 \approx \Sigma_2$.

In another aspect of the present invention, the handle portion 133 shown in FIG. 6 has a shank 134, which slideably and rotatably fits inside hollow sleeve section 135. Handle 133 can be pulled out, pushed in and/or rotated in order to find the most ergonomic position for shoving, picking up and throwing a load from the shovel. Shank 134 can be slid to any one of continuous positions along sleeve 135 by utilizing friction hold against the inside surface of the hollow sleeve 135. However, pins 137 are preferred which engage holes 139 judiciously placed along the length of section 135. Length E along handle 133 is between 12 to 18 inches, while length L along section 135 is between 16 to 24 inches, although other lengths can also be used. The over-all length d of the shovel apparatus can be increased by $\Delta_d$, preferably between 6 to 12 inches, while the overall height c can be increased by $\Delta_c$ preferably between about 4 to 8 inches, thus yielding an overall length G between about 89 to 100 inches and overall height X between about 42 to 66 inches. With the preferred dimensions cited here, the shovel blade can be comfortable raised to a height between about 36 to 44 inches.

Figure 7:
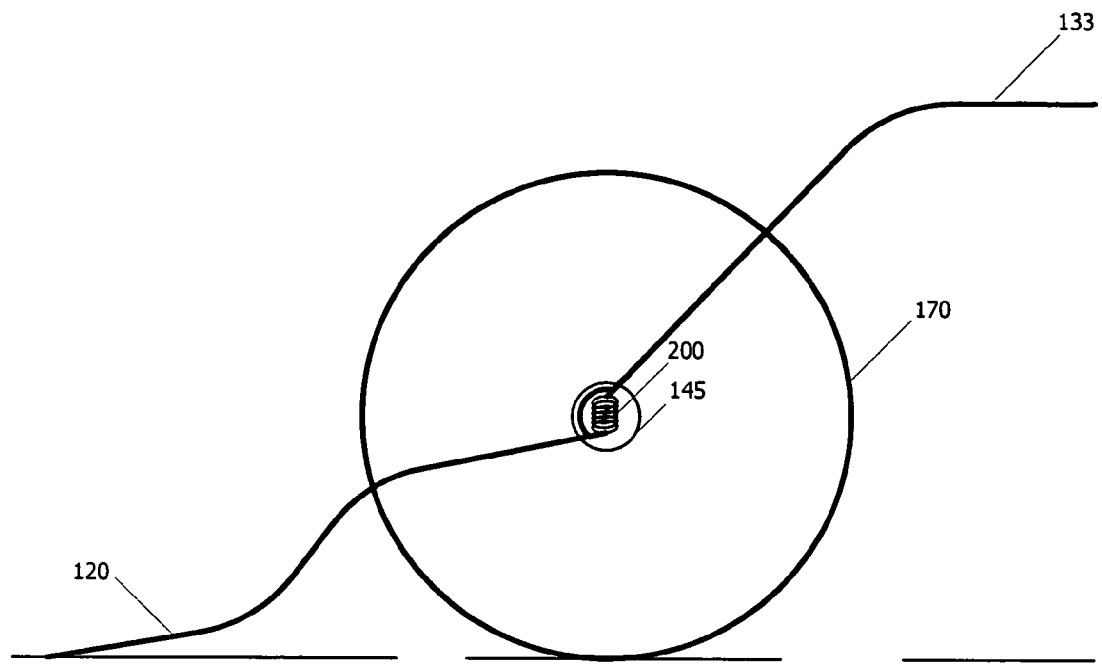
FIG. 7 is a schematic drawing of an aspect of the present invention involving springs as an assist in propelling materials from the shovel blade, according to the present invention.
Figure 8:
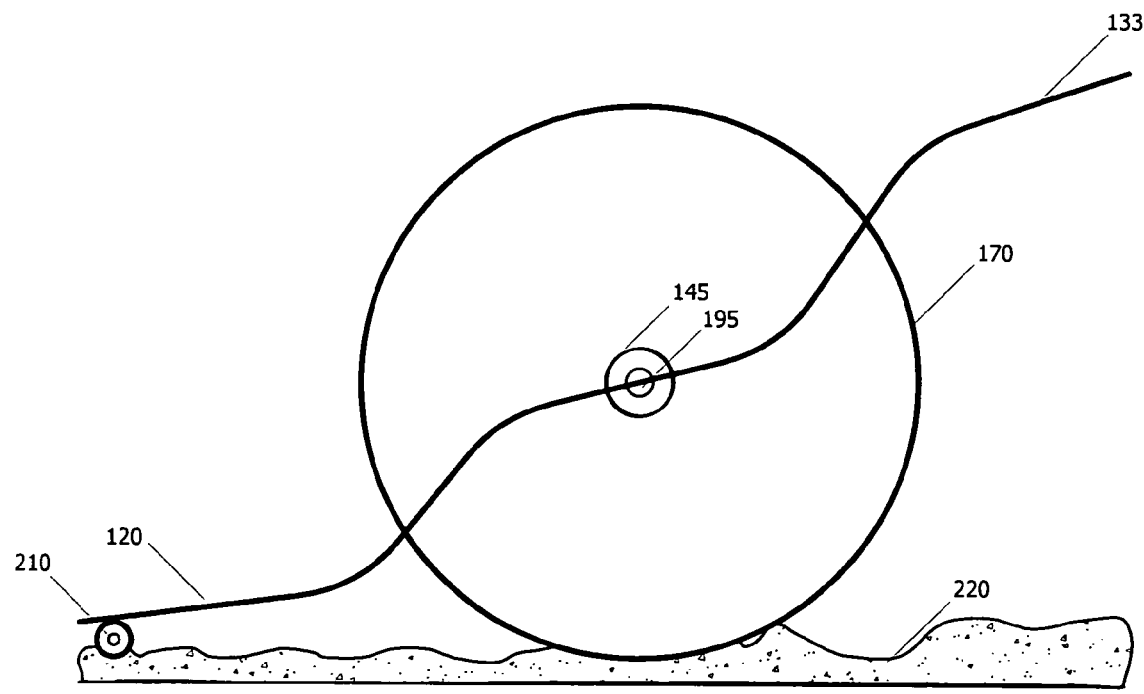
FIG. 8 is a schematic drawing of an aspect of an embodiment of the present invention showing blade rollers employed for ease of travel of the blade over rough ground, such as a gravel surface, according to the present invention.

In another aspect of the present invention, a plurality of springs 200 (only one shown in the side view in FIG. 7) are utilized to provide an enhanced recoil reaction at the fulcrum line when the tire used for wheel 170 is not flexible as for example, a bicycle tire with a pneumatic tube. In FIG. 7, axle 190 is adapted to receive one spring at each of the two respective ends 195 of the axle which act as a fulcrum and transmit a recoil reaction to the shovel blade 120 from an action applied at the axle 190.

In addition to the ergonomic advantages, embodiments of the present invention provide enhanced functional performance through a judicious use of a fulcrum line formed at about the central portion of the wheel assembly shown in FIG. 5. Line x' passing through the center of the fulcrum area 145 parallel to the ground datum line x forms the fulcrum line. A force F applied to the fulcrum through an action at the handle 133 can be resolved into a horizontal component $F_h$ and a downward vertical component $F_v$, as shown in FIG. 5. With no substantial resistance to the horizontal component $F_v$, the wheel rolls to the left, in accordance with the direction of the applied force F shown in FIG. 5, while the ground under the wheel reacts to the downward component $F_v$ giving rise to an upward recoil reaction—$F_v$ by the wheel. A brisk and mostly downward action on the handle 133, using arm and/or body weight, for example, produces a recoil assist to the throwing power. The magnitudes of the force component vectors $F_h$ and $F_v$ are determined by substantially angle $\beta$, and the magnitude of the transmittal force F. Angle $\Omega$ contributes to the throwing power. Furthermore, the shovel blade 120 can be formed in different configurations to assist in efficient release of material 160 from the shovel blade 120. For example, the shovel blade 120 can have a bottom portion with a relatively large radius of curvature $\rho$, resembling a scoop, for easy sliding of material from the shovel blade, as well as for keeping the material from sliding backwards and spilling off the shovel blade. It will be appreciated by those skilled in the art that these various parameters can be set to values that are commensurate with the ergonomic and functional requirements for a particular use or application of a wheeled shovel of the present invention.

The embodiments of the present invention shown in FIGS. 1–8 are adaptable for various enhancements and improvements in useful ways. For example, a shovel blade may be designed with a more flexible material to enhance the ability to throw the shovel load. The flexibility of the blade would provide a trampoline effect as the blades flexes back to its original shape from a bent shape as it accelerates to unload the load. A comparable effect is obtained by attaching the shovel blade to the shovel yoke with a spring-loaded hinge (not shown) that enhances the throwing capacity of the wheeled shovel. Furthermore, shovel blade 120 is fitted with side walls 125 as shown in FIG. 3 in order to be able to pick up and retain liquid like substances, such as snow slush. In another aspect, the driving member, resembling a yoke, is made to fold at the fulcrum area where a quick release wheel is mounted and removed readily for ease of transporting the apparatus. As an alternative, the driver member comprises two halves (not shown) attached to each other at the fulcrum area 145 of FIG. 1. It will also be understood that a plurality of wheels of various widths can be used instead of the one wheel shown in FIGS. 1–8 of the present invention. Further, the apparatus can be motorized to pick up, transport and propel a load of material from the wheeled shovel of the present invention. Also, motor energy can be utilized to store energy in a spring or in another energy storing device, which in turn can be used on demand to assist in pushing and/or throwing the load on the shovel.

Though these numerous details of the disclosed apparatus and method are set forth here, such as the various dimensions, to provide an understanding of the present invention, it will be obvious, however, to those skilled in the art that these specific details need not be employed to practice the present invention. That is, while the invention has been particularly shown and described with reference to the embodiments thereof, it will be understood by those skilled in the art that various changes in form and details may be made without departing from the spirit and scope of the invention.

What is claimed is:

1. An apparatus for removal and disposal of materials comprising:
    a wheel assembly having an axle and a single wheel with a diameter equal to or greater than about 30 inches, the axle including a fulcrum member capable of transmitting a recoil reaction to an action applied at the axle;
    a driving member having two spaced-apart members, an upper portion, a middle portion, and a lower portion, wherein the middle portion is attached to the fulcrum member of the axle with the axle positioned adjacent the middle portion having longitudinal adjustability relative to the middle portion that allows selective adjustment to the axle longitudinal positioning without substantially changing the axle height relative to the surface on which the apparatus is being supported;
    a handle disposed at about the upper portion of the driving member for moving the wheel assembly; and
    a blade disposed at about the lower portion of the driving member, the blade adapted to pick up a load of material from a surface when the blade is lowered to the surface by raising the handle and pushing the handle forward;
    wherein the wheel is substantially centrally disposed between the two spaced-apart members of the driving member, and wherein the apparatus is configured such that, when the handle is pushed generally downwards, the blade springs generally upwards and forwards throwing the load of material briskly upward and away from the blade in response to a recoil through the fulcrum member at the axle of the wheel assembly and pivoting of the driving member about the axle of the wheel assembly.

2. The apparatus according to claim 1, wherein the axle comprises a tubular body having first and second ends which support spokes connecting the axle to a rim of the wheel assembly, the tubular body forming the fulcrum member.

3. The apparatus according to claim 1, wherein the wheel assembly has a quick release for disconnecting the wheel assembly from the driving member.

4. The apparatus according to claim 1, wherein the wheel assembly includes a rim adapted to receive an elastic member, including a bicycle tire.

5. The apparatus according to claim 1, wherein the middle portion of the driving member is generally S-shaped having an upper curved section between the handle and the axle and a lower curved section between the axle and the blade.

6. The apparatus according to claim 1, wherein the blade has two sidewalls and a back wall to keep the load of material from spilling out from the blade.

7. The apparatus according to claim 1, wherein the blade is shaped in the form of a scoop having a radius at the bottom.

8. The apparatus according to claim 1, wherein the driving member comprises a tubular material.

9. The apparatus according to claim 8, wherein the tubular material comprises metal.

10. The apparatus according to claim 8, wherein the tubular material comprises plastic.

11. The apparatus according to claim 1, wherein the handle is slidably adjustable through a telescoping tubular material inside a hollow tubular driving member.

12. The apparatus according to claim 1, wherein the overall length of the apparatus is between about 78 inches to about 88 inches, and wherein the apparatus is configured such that its overall length can be increased to between about 89 inches to about 100 inches.

13. The apparatus according to claim 1, wherein the wheel has a diameter between about 30 inches to about 36 inches.

14. The apparatus according to claim 1, wherein the height of the handle from a datum plane directly under the wheel assembly is between about 48 inches to about 60 inches, and wherein the apparatus is configured such that the height of the handle from the datum plane can be adjusted to between about 42 inches to about 66 inches.

15. The apparatus according to claim 1, wherein the load of material is selected from the group consisting of one or more of sand, gravel, snow and slush.

16. An apparatus for removal and disposal of materials comprising:
    a wheel assembly having an axle and a single wheel having a diameter equal to or greater than about 30 inches, the axle comprising a tubular body having two end portions;
    the axle adapted to act as a fulcrum and transmit a recoil reaction to an action applied at the axle;
    an elongate driving member having a curved upper portion, a generally straight middle portion, and an open curved lower portion, wherein the middle portion is attached to each end portion of the axle such that the wheel is disposed relative to the driving member for travel within a width of a footprint of the driving member, the axle positioned adjacent the middle portion and having longitudinal adjustability relative to the middle portion that allows selective adjustment to the axle longitudinal positioning without substantially changing the axle height relative to the surface on which the apparatus is being supported;
    a handle disposed at about the upper portion of the driving member for moving the wheel assembly; and
    a shovel blade disposed at about the lower portion of the driving member, the shovel blade adapted to pick up material from a surface when the shovel blade is lowered to the surface by raising the handle and pushing the handle forward;
    wherein the shovel blade is configured to spring generally upwards and forwards throwing the material briskly upwards and away from the shovel blade in response to a recoil reaction through the fulcrum at the axle of the wheel assembly and pivoting of the elongate driving member about the axle of the wheel assembly when the handle is pushed downwards.

17. The apparatus according to claim 16, wherein the end portions of the axle's tubular body support spokes connecting the axle to a rim of the wheel assembly, the tubular body forming the fulcrum member.

18. An apparatus for removal and disposal of materials comprising:
    a wheel assembly having an axle, the axle comprising a tubular body having two ends;

the axle adapted to receive a plurality of springs at the two respective ends of the axle to act as a fulcrum and transmit a recoil reaction to an action applied at the axle;

an elongate driving member having a curved upper portion, a generally straight middle portion, and an open lower portion, wherein the middle portion is attached to the springs at each end of the axle;

a handle formed from the upper portion of the driving member for moving the wheel assembly;

a shovel blade attached to the lower portion of the driving member, the shovel blade adapted to pick up material from a surface when the shovel blade is lowered to the surface by raising the handle and pushing the handle forward;

wherein the shovel blade springs generally upwards and forwards, thereby releasing the material briskly away from the apparatus when the handle is pushed downwards to cause the springs to compress and recoil through the fulcrum member at the axle of the wheel assembly; and wherein the plurality of springs comprises a pair of springs, one spring at each end of the two ends of the axle.

19. The apparatus according to claim 18, wherein the pair of springs is compressed when the handle is pushed downwards, the compression of the springs providing the recoil action.

20. The apparatus according to claim 16, wherein the shovel blade has two sidewalls and a back wall to keep the load of material from spilling out from the shovel blade.

21. The apparatus according to claim 16, wherein the shovel blade is shaped in the form of a scoop having a radius at the bottom.

22. The apparatus according to claim 16, wherein the driving member comprises a tubular material.

23. The apparatus according to claim 22, wherein the tubular material comprises metal.

24. The apparatus according to claim 16, wherein the handle is slidably adjustable through a telescoping tubular material inside a hollow tubular driving member.

25. The apparatus according to claim 16, wherein the overall length of the apparatus is between about 78 inches to about 88 inches, and wherein the apparatus is configured such that its overall length can be increased to between about 89 inches to about 100 inches.

26. The apparatus according to claim 16, wherein the wheel has a diameter between about 30 inches to about 36 inches.

27. The apparatus according to claim 16, wherein the height of the handle from a datum plane directly under the wheel assembly is between about 48 inches to about 60 inches, and wherein the apparatus is configured such that the height of the handle from the datum plane can be adjusted to between about 42 inches to about 66 inches.

28. The apparatus according to claim 16, wherein the load of material is selected from the group consisting of one or more of sand, gravel, snow and slush.

29. A method of snow removal with an apparatus comprising a single wheel having a diameter equal to or greater than about 30 inches, a yoke having a handle at a first end portion of the yoke, a shovel blade at a second end portion of the yoke, wherein the yoke is mounted onto an axle of the wheel such that the wheel is disposed relative to the yoke for travel within a width of a footprint of the yoke, the axle positioned adjacent the middle portion and having longitudinal adjustability relative to the yoke that allows selective adjustment to the longitudinal positioning of the axle without substantially changing the axle height relative to the surface on which the apparatus is being supported; the method comprising:

moving the apparatus along a path by pushing the handle and rolling the single wheel in a direction commanded by the handle;

shoving onto the shovel blade a load of material lying along the path of the apparatus;

pressing the handle downwards, after picking up the load of material, to lift the shovel blade to a level that clears the path;

transporting the balanced load of material to a destination;

at the destination, briskly applying a force at the handle of sufficient magnitude for pivoting the yoke about the wheel axle such that the shovel blade throws the load of material a substantial distance away from the apparatus in response to the pivoting of the yoke.

30. The method according to claim 29, wherein the diameter of the wheel is between about 30 inches to about 36 inches.

31. The method according to claim 29, further comprising increasing the overall length of the apparatus from between about 78 inches to about 88 inches to between about 89 inches to about 100 inches.

32. The method according to claim 29, further comprising adjusting the height of the handle from a datum plane directly under the wheel from between about 48 inches to about 60 inches to between about 42 inches to about 66 inches.

33. The method according to claim 29, wherein the load of material is selected from the group consisting of sand, gravel, snow and slush.

34. A method of snow removal with an apparatus comprising a wheel having a portion substantially at the waist level of an operator, a yoke having a handle at a first end portion of the yoke, a shovel blade at a second end portion of the yoke, wherein the yoke is mounted onto an axle of the wheel, the method comprising:

moving the apparatus along a path by pushing the handle and rolling the wheel in a direction commanded by the handle;

shoving onto the shovel blade a load of material lying along the path of the apparatus;

pressing the handle downwards, after picking up the load of material, to lift the shovel blade to a level that clears the path;

adjusting further the level of the shovel blade to achieve a balanced load with respect to and over the axle of the wheel;

transporting the balanced load of material to a destination;

at the destination, briskly applying a force at the handle to propel the load of material to a substantial distance away from the apparatus;

wherein the axle is adapted to receive a plurality of springs at the two respective ends of the axle to act as a fulcrum and transmit a recoil reaction to an action applied at the axle.

35. The method according to claim 29, wherein the wheel is adapted to receive an elastic material capable of producing the recoiling in response to an action applied at the axle.

36. The method according to claim 29, wherein the force is initially applied above the waist level of the operator and ends below the waist level.

37. The method according to claim 29, wherein the load is propelled to the side of the shovel blade.

38. The method according to claim 29, wherein the load is propelled in a straight-out departure path from the shovel blade.

39. A wheeled shovel comprising a wheel assembly having a single wheel and an axle, the wheel having an outer diameter of greater than about 30 inches such that a portion of the wheel assembly is substantially at a user's waist level, a driving member having an upper portion, a middle portion, and a lower portion, the middle portion being coupled to the axle, the axle positioned adjacent the middle portion and having longitudinal adjustability relative to the middle portion that allows selective adjustment to the axle longitudinal positioning without substantially changing the axle height relative to the surface on which the apparatus is being supported, a handle attached to the upper portion of the driving member for moving the wheel assembly, and a shovel blade attached to the lower portion of the driving member for picking up a load of material, the wheel disposed relative to the driving member for travel within a width of a footprint of the driving member.

40. The wheeled shovel according to claim 39, wherein the middle portion has a generally curved "S-shape" defined by a lower portion included angle $\phi$ between about eighty degrees and about ninety degrees, and an upper portion included angle $\phi'$ between about eighty degrees and about ninety degrees.

41. The wheeled shovel according to claim 39, wherein the wheel assembly includes a rim and a plurality of spokes radially projecting from the axle connecting the axle to the rim.

42. The wheeled shovel according to claim 39, wherein the ratio of the length of the driving member to the height of the handle is greater than 1:1.

43. A wheeled shovel comprising a wheel assembly having a wheel and an axle configured for transmitting a recoil reaction in response to an action applied at the axle, the wheel having an outer diameter of between about 30 inches to about 36 inches such that a portion of the wheel assembly is substantially at a user's waist level, a driving member having an upper portion, a middle portion, and a lower portion, the middle portion being coupled to the axle, a handle attached to the upper portion of the driving member for moving the wheel assembly, and a shovel blade attached to the lower portion of the driving member for picking up a load of material, whereby the shovel blade propels the load of material away from the shovel blade when the handle is pushed generally downwards to cause the wheel assembly to compress and recoil through the axle, wherein the axle comprises a tubular body having two ends with at least one spring at each said end of the tubular body, whereby the springs are compressed when the handle is pushed generally downwards such that the compression of the springs provides a recoil action.

44. The wheeled shovel according to claim 43, wherein the middle portion of the driving member is attached to the springs.

45. The wheeled shovel according to claim 39, wherein the middle portion of the driving member is generally "S-shaped" and includes a curved upper elbow and a lower curved elbow, and wherein the driving member is coupled to the axle and configured such that upon movement of the driving member about the axle, the upper curved elbow moves a distance H that is greater than the distance A moved by the lower curved elbow.

46. The wheeled shovel according to claim 39, wherein the height of the shovel blade prior to picking up the load of material is less than the height of the axle.

47. The wheeled shovel according to claim 39, wherein the height of the shovel blade during propelling of a load of material is less than or about equal to the height of the wheel.

48. The apparatus according to claim 1, wherein the height of the blade when lowered to the surface is less than the height of the axle, and wherein the height of the blade during the recoil is less than or about equal to the height of the wheel.

49. The apparatus according to claim 1, wherein the apparatus is configured such that the middle portion of the driving member is generally horizontal when the blade is lowered to the surface to thereby allow selective adjustment to the longitudinal positioning of the fulcrum without substantially changing the handle height relative to the surface on which the apparatus is being supported.

50. The apparatus according to claim 1, further comprising at least one sliding device attaching the axle to the middle portion of the driving member, the sliding device being slidable relative to the middle portion to thereby allow repositioning of the attachment point of the axle to the middle portion.

51. The apparatus according to claim 1, wherein the handle is adjustable through an extendable and rotatable connection to the driving member such that the handle can be slidably pulled out, slidably pushed in, and rotated relative to the driving member to thereby selectively adjust the handle height, handle length, and leverage ratio of the apparatus.

52. The apparatus according to claim 51, wherein the handle includes a substantially flat portion that is generally horizontal when the blade is lowered to the surface.

53. The apparatus of claim 16, wherein the shovel blade has a height when lowered to the surface that is less than the height of the axle and that is less than or about equal to the height of the wheel after having picked up the material.

54. The method of claim 29, further comprising selectively repositioning the mounting location of the axle to the yoke.

55. The wheeled shovel according to claim 39, wherein the wheel is substantially centrally disposed relative to a width of the apparatus.

56. The wheeled shovel according to claim 49, wherein the middle portion of the driving member includes two spaced-apart members, and wherein the wheel is substantially centrally disposed between the two spaced-apart members.

57. The wheeled shovel according to claim 39, further comprising means for selectively repositioning the attachment point of the axle to the middle portion.

58. The apparatus according to claim 1, wherein the handle is adjustable through an extendable connection to the driving member such that the handle can be slidably extended or slidably retracted relative to the driving member to thereby selectively adjust the handle height, handle length, and leverage ratio of the apparatus, whereby the handle positioning can be adjusted in coordination with the adjustment to the axle longitudinal positioning to substantially maintain the leverage ratio of the apparatus.

59. The apparatus according to claim 1, wherein the handle is adjustable through a rotatable connection to the driving member such that the handle can be rotated relative to the driving member to thereby selectively adjust the handle positioning and leverage ratio of the apparatus.

* * * * *